(12) United States Patent
McCulloch

(10) Patent No.: US 9,484,013 B1
(45) Date of Patent: Nov. 1, 2016

(54) SPEECH SIMULATION SYSTEM

(71) Applicant: Mary Elizabeth McCulloch, Palmyra, PA (US)

(72) Inventor: Mary Elizabeth McCulloch, Palmyra, PA (US)

(*) Notice: Subject to any disclaimer, the term of this patent is extended or adjusted under 35 U.S.C. 154(b) by 225 days.

(21) Appl. No.: 13/771,038

(22) Filed: Feb. 19, 2013

Related U.S. Application Data

(60) Provisional application No. 61/600,825, filed on Feb. 20, 2012.

(51) Int. Cl.
*G10L 13/04* (2013.01)

(52) U.S. Cl.
CPC ..................... *G10L 13/04* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,047,953 A | * | 9/1991 | Smallwood | G09B 21/00 704/267 |
| 2007/0293781 A1 | * | 12/2007 | Sims et al. | 600/534 |
| 2008/0111710 A1 | * | 5/2008 | Boillot | G06F 3/0346 341/22 |
| 2009/0143704 A1 | * | 6/2009 | Bonneau et al. | 600/595 |

FOREIGN PATENT DOCUMENTS

GB  2295457 A  * 5/1996  ......... A61B 5/04888

* cited by examiner

Primary Examiner — David Hudspeth
Assistant Examiner — Shreyans Patel
(74) Attorney, Agent, or Firm — Morgan, Lewis & Bockius LLP

(57) ABSTRACT

A speech simulation system adapted for a user to communicate with others. The system has at least one sensor to sense controlled and coordinated body movement. The system has a computer processor connected to the at least one sensor. The system has a database memory connected to the computer processor. The system has software programming to operate the computer processor. The system has a feedback device connected to the computer processor and directed to the user. The system has an outward audio output device connected to the computer processor to provide sound and a speaker connected to the outward audio output device.

21 Claims, 4 Drawing Sheets

SPEECH SIMULATION SYSTEM

This application claims the benefit of and incorporates by reference U.S. Provisional Application No. 61/600,825 filed Feb. 20, 2012.

BACKGROUND

The present invention relates generally to speech simulation devices to aid users with communication disabilities, and more particularly to speech simulation devices for users with other physical disabilities.

Speech challenged individuals with physical disabilities often have difficulty effectively communicating simple concepts and ideas. For example, individuals with Cerebral Palsy and related diseases often lack the necessary motor skills to speak or operate even simplified keyboards. It has been estimated that in the United States, 3.3 individuals per thousand children suffer from Cerebral Palsy. If these figures are applied to the current population of the world; as many as 23 million individuals may be affected by cerebral palsy.

Several speech simulation devices on the market offer solutions to users with communication disabilities, but often at a high cost. These high cost solutions remain out of reach to low income users in the U.S. and underdeveloped countries. Many of these existing devices utilize a touch screen or use keyboards with large icons that represent ideas/words. These existing devices have proven difficult to use for people with limited muscular control and are relatively expensive. One advanced approach utilizes eye gaze computer systems that track pupil movement. The prices range for the eye gaze computer systems are in the range of $15,000-$20,000 dollars and the price does not include maintenance costs. In less developed countries, and even in the United States the number of affected individuals is high while the ability to pay for such devices is low.

An object of the present invention is to provide a speech simulation device that allows the user to communicate by sensing simple movement of a controllable part of the user's body.

SUMMARY OF THE INVENTION

A speech simulation system adapted for a user to communicate with others. The system has at least one sensor to sense controlled and coordinated body movement. The system has a computer processor connected to the at least one sensor. The system has a database memory connected to the computer processor. The system has software programming to operate the computer processor. The system has a feedback device connected to the computer processor and directed to the user. The system has an outward audio output device connected to the computer processor to provide sound and a speaker connected to the outward audio output device.

DETAILED DESCRIPTION

The present invention is a speech simulation system and method of use, as shown in FIGS. 1-4. The speech simulation device includes a feedback device, a sensor to control the system, a computer processor with software, power supply, speaker for output and means to input words and phrases in a data base, as shown schematically in FIG. 1. The speech simulation system employs a sensor to detect slight body movement of a user in order to make choices. There can be more than one sensor used to detect the body movement of the user. The intended user of the present invention usually has very limited muscle movement that can be controlled in a coordinated manner. Examples of limited muscle movement that can be controlled in a coordinated manner are leg movement, arm movement, head movement and movement of a finger or toe. Also, sounds from the user, such as an intentional cough or grunt can be used with an audio sensor. The present invention uses the sensor to sense the body movement of the user. This movement can be quite slight, such as a very small movement of a finger or sensing the tensing of muscles in the body.

The sensor translates the user's movements into data that a computer processor can process using computer firmware or software. This can be as simple as translating the movement into yes or no commands. The motion and coordination capabilities of the user can be as simple as the ability to voluntarily kick or not kick the user's leg during communication with another person. For example, if the user has some leg or arm coordination, a sensor can be secured on a knee or elbow. If the user has very little coordination in the limbs, but has some biting control, another type of sensor can be placed between the user's teeth. For biting, the sensor could recognize a yes command as two consecutive bites and a no command as solely one bite. Other types of sensors may be used to detect facial or muscle tensing. Still, other sensors may be pressure sensors for sensing the tensing of muscles or biting pressure. Electronic sensors can be used to detect body movements past the sensor, low levels of nerve signals to muscles or eye position movement. Audio sensors can detect grunts or coughing type sounds. Light sensors can be used to sense movement of a body part past the sensor when the light is blocked.

Figure 1:
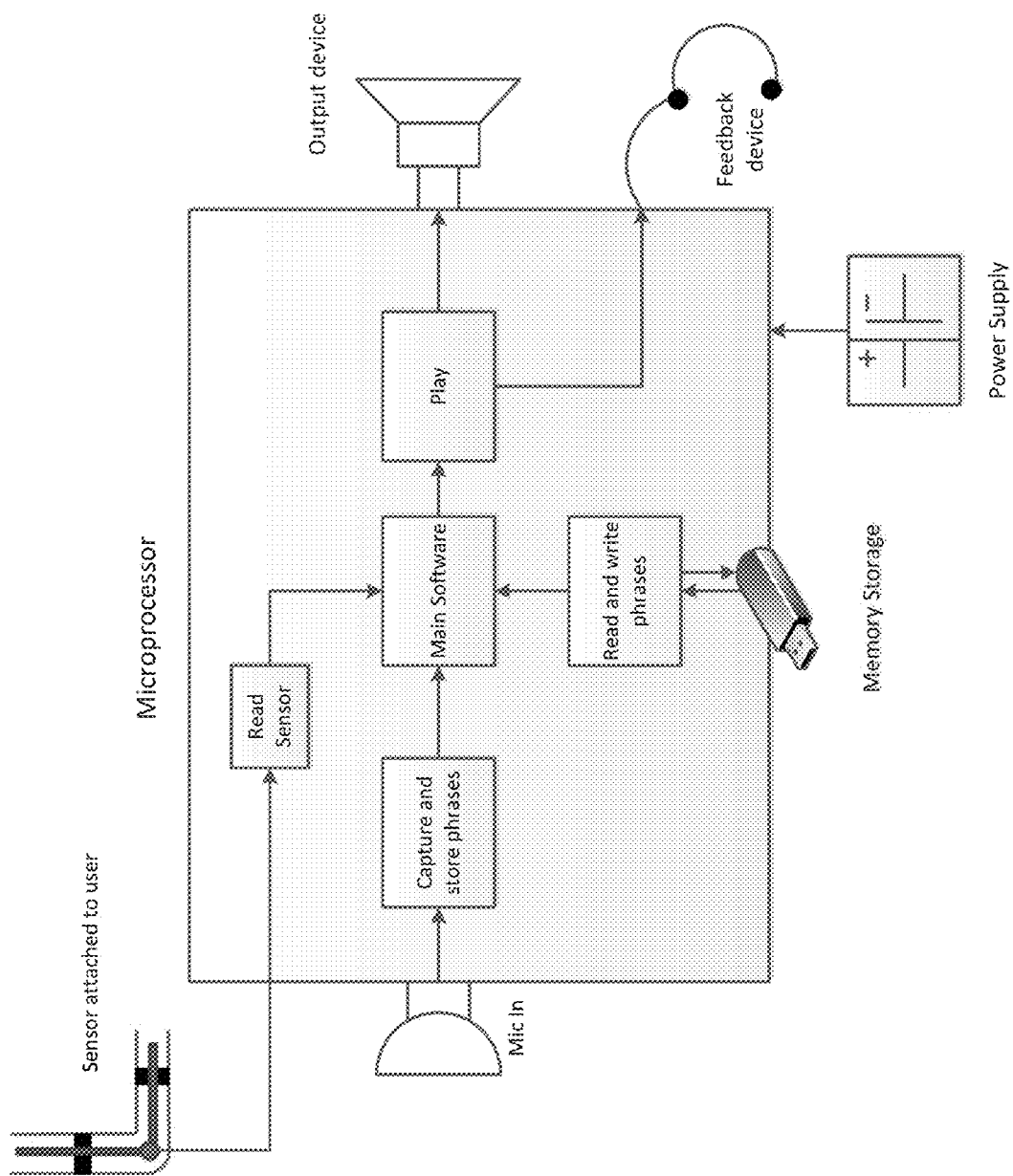
FIG. 1 is a schematic of a speech simulation system according to the present invention.
Figure 2:
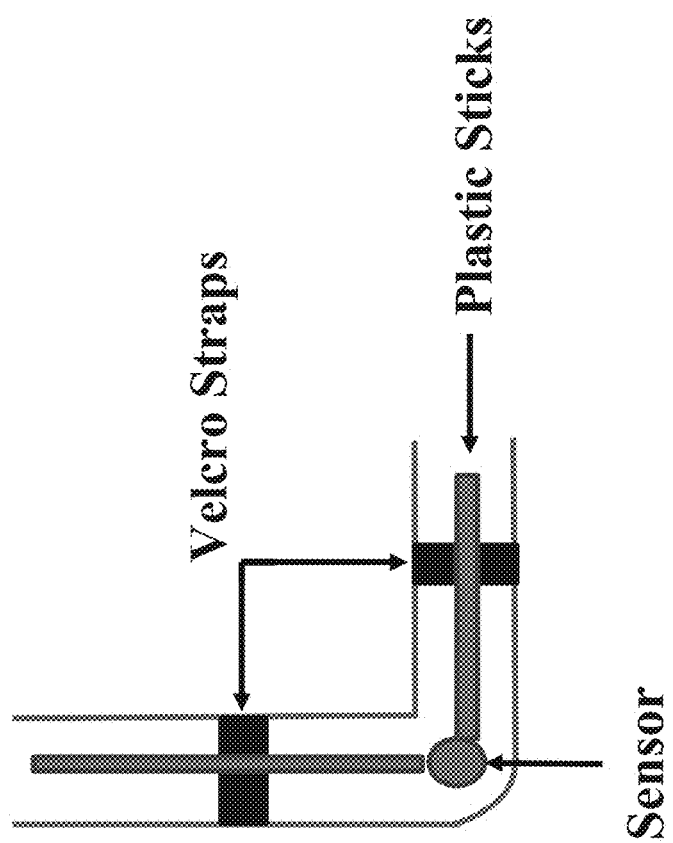
FIG. 2 is a schematic of a sensor setup on a user according to the present invention.

FIG. 2 shows a simple example of a sensor attached to a user. FIG. 2 shows two lightweight flexible plastic strips joined by a moveable sensor at a user's joint such as a knee, where the user has at least some minimal motion control. The strips are gently attached to the user's body on both ends of the joint. The sensor is of a type that is incremental and self-adjusting and further does not require the user to press a button or to trigger a switch. Knowledge of the absolute position of the sensor is not necessary, which yields much flexibility to the user. The sensor can have the capability to measure even small relative movements and optionally the direction of that movement, where even slight jerks will suffice to provide the necessary response to the computer processor. Typical movements on a large joint such as the knee may be plus or minus 10 degrees from the recent resting position to indicate a response. However other body locations and other sensors may not be expressed in degrees, but in percentage of full scale movement of the body part being monitored by the sensor.

The sensor of FIG. 2 can be a potentiometer which outputs an analog signal, nominally from zero to 5V DC. The sensor could also be a digital encoder which outputs relative position changes as a stream of digital pulses. Other types of sensors may include pressure or position sensors. There are two classifications of sensors that can be used with the speech simulation system. One is classified as having the ability to generate an affirmative event and negative event that the computer processor can recognize. An example of this would be the user's kick from the knee. Some users may have the range of motion to kick forward and backward from the knee. These kicks may be measured to determine if the movement is an affirmative by a forward kick or negative by a backward kick. This means that the user has the option to either answer yes or no by using either forward or backward kicks. The second is classified by only having the ability to generate one type of event that the computer processor can recognize. This is for a person that is only able to generate one type of event or one type of movement of the body. An example of one type event is when a user can only do a kick in one direction, twitch, or tighten a facial muscle. Unlike a joint, a facial twitch can only tense a muscle. The user cannot "untwitch", rather the user just relaxes the muscle to original position. If the act of twitching is defined as the affirmative event, a negative event can be defined as the user being relaxed for some specified time interval or the user twitching twice in quick succession. Having the ability to generate both an affirmative event and negative event is preferred. If the user has both events to control the speech simulation system, the user can achieve improved communication speed with the speech simulation process. This is where employing multiple sensors has an advantage. The user can apply two sensors to two different joints to generate both an affirmative event and negative event. One sensor can be used to indicate an affirmative event and the other sensor is used to indicate a negative event.

The computer processor of the speech simulation device includes software programming to accomplish effective communication to other people. The speech simulation device includes a first audio output connected to the computer processor that acts as the feedback device. The first audio output device is connected to at least one earphone(s) that the user would wear or at least one speaker directed toward the user. There is a second audio output device connected to the computer processor to supply the sound of words or phrases through a speaker to someone the user wishes to communicate with. The software program presents a choice using prerecorded phrases consisting of a word or words to the user through the earphone(s). The choice is either a phrase that can be played aloud through the second audio device or is a phrase that leads to another choice before anything is played aloud through the second audio device. The user then responds to the choice with a simple motion to activate the sensor to select the choice. The activation of the sensor will depend on the configuration of the sensor used and how the sensor senses body movement. Depending on the user's selection, the next choice may be heard by the user or the phrase selected may be played aloud through the second audio device. The software program allows for the user to cycle through the choices of phrases under the control of the movements of the user in relation to the sensor.

The software includes programming to determine if the body movement is significant or not. It is desirable that the software has the ability to set a new zero to be assumed at the average of the sensor's latest positions, when the sensor is at any given position for an extended period of time. This feature is referred to as auto-zeroing. Relative movements are then calculated by the software from this new zero position. The auto-zeroing takes place continuously in the computer processor and is implemented as a simple long term average. The auto-zeroing feature provides the advantage of increased flexibility in the speech simulation system and allows the sensor to be placed on the user's body without critical positioning or adjustment. This provides a distinct advantage over using a simple switch. For example, the user does not have to struggle to reach a button to activate the switch or extend a hand to reach a key at fixed position.

Ideas and common phrases will be presented in a sequence of choices through earphone(s) to the user. The sequence of choices represents different categories of choices to be used by the user. As an example, at the first level the choices could be Help, Food, Greetings or Emotional Responses. The user will select the choice category required to communicate the user's thoughts through the movement of the user's body near the sensor. By using ideas and phrases instead of individual letters as choices, throughput will be enhanced and expedited. The software can incorporate a short learning curve to allow the user to be self-taught. After the user has become comfortable with the system, the user can begin to make movements at the sensor to control the "no" command multiple times once the user memorizes the order that the choice categories will be presented through the earphone(s). Using the example of FIG. 2 with the example of choices above, the user would move the joint to create a negative event three times and then create a positive event to select the Emotional Response category. The ability of the software to allow for skipping through choices rapidly speeds up the user's ability to effectively communicate. Once a category is selected, further choices of words or additional categories are presented to the user via the earphone(s). The chosen phrases to be used for communication with others will be presented through a speaker connected to the second audio output device to enable the communication. In place of the earphone(s), the first audio output device can be connected to a speaker having a lower volume or slightly different tone which is directed toward the user.

The speech simulation system supports the recording of additional words and phrases and/or translations to other languages in the database to be used by the computer processor. The database can be loaded using the Mic In or Memory Storage of FIG. 1. Where the Mic In is a microphone into which someone can speak and have words/phrases recorded to be stored in the database. The Memory Storage can be a USB drive or SD memory device that stores the database and is connected to the computer processor. Having a removable Memory Storage allows for easy updating of the system. A small vocabulary may be provided in the database for first time users that use a simple set of categories and phrase choices, while more experienced users can make use of more categories with a wider selection of words. Another useful feature of the system is that the output timing does not have to be word by word. Instead, the user can have the capability using the computer processor and database to compose whole sentences or write at length to be stored and communicated later. This means the user can compose their thoughts and writings to be presented to others at a later time. For example, the user could compose a speech prior to the presentation of the speech or a food choice for a specific restaurant prior to arrival at the restaurant. The computer software can have an audible alphanumeric capability to allow the user to be presented with individual letter and number selections through the earphone(s) as choices. This allows the user to string together additional words and phrases by spelling out the letter selections and with a saving capability in the software, the user can save the string to the database for later use. During the alphanumeric selection process to create words and phrases, the software may include the ability to offer whole word or phrase choices before the user completes the full spelling in order to speed up communications.

Figure 3:
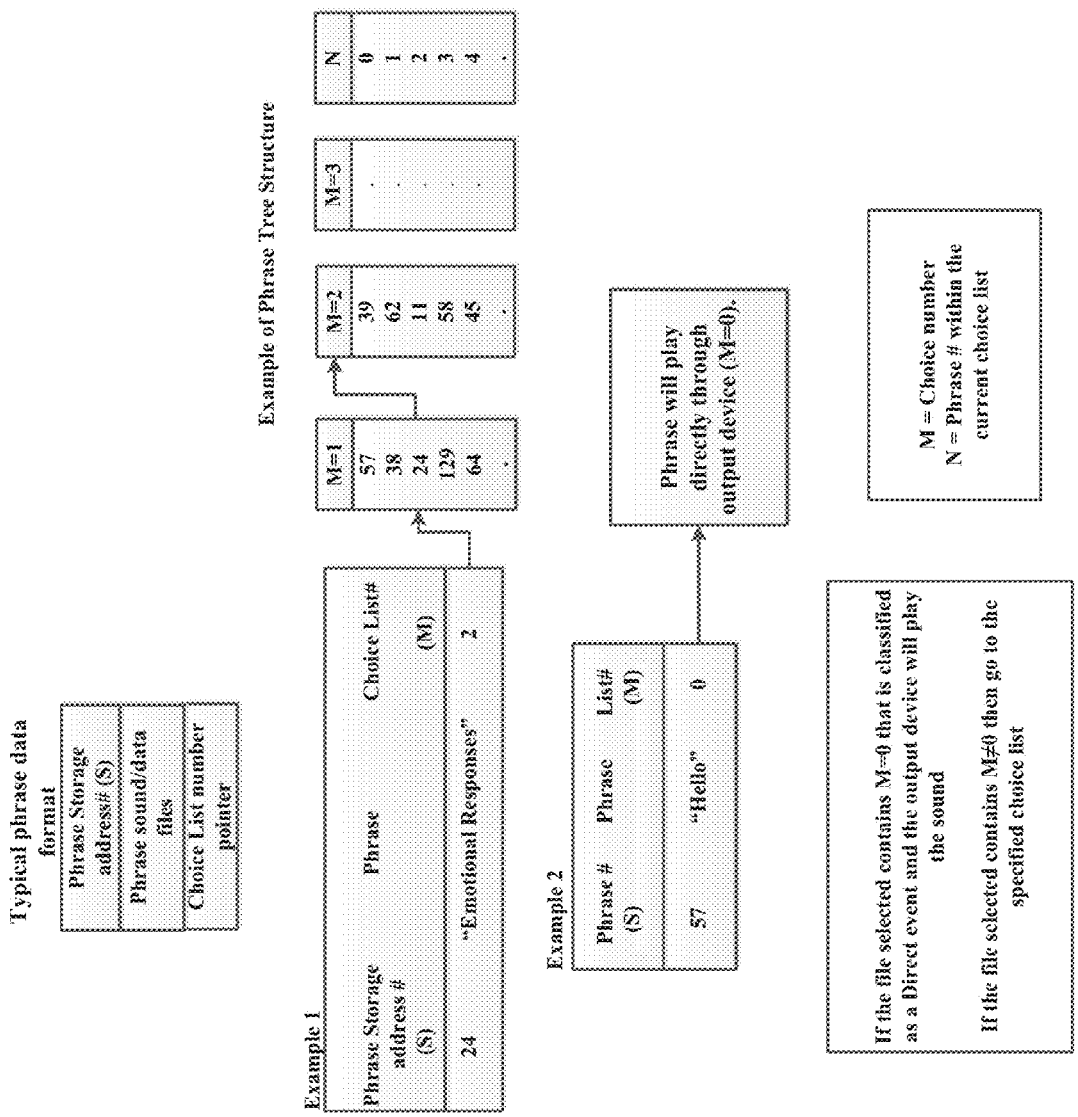
FIG. 3 is a phrase tree flow diagram of choices according to the present invention.
Figure 4:
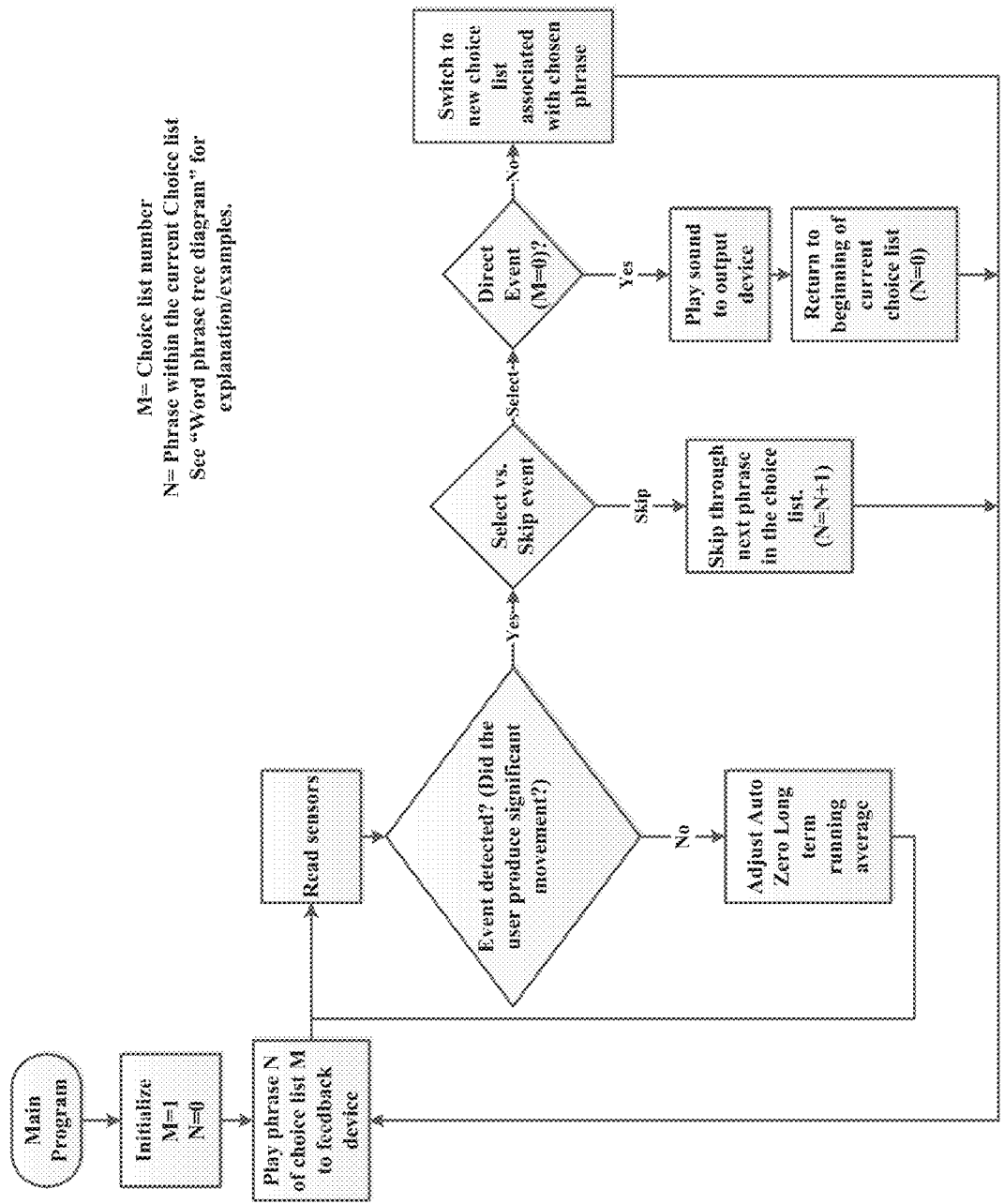
FIG. 4 is a overview flow chart of software programming according to the present invention.

The speech simulation system is a successful solution due to its flexibility. The speech simulation system can be specifically tailored to each user's limited abilities. By having the option to place the various sensors on the joint/muscle groups where the user has the most control, this invention lends itself to various types of disabilities, while being relatively inexpensive as compared to other systems. It is especially useful to individuals who are blind and cannot see a keyboard. If the user cannot hear, but can see, the first audio output can be supplemented by having a digital output on a small screen to present the choices. FIGS. 3-4 show possibilities for the software programming. FIG. 3 shows a flow diagram of a typical phrase data format that would be stored in the database. FIG. 3 shows two examples. The example 1 shows phrase 24 selected, phrase 24 includes a list of sub choices under the M=2 list, that list of sub choices could include for example number 39 representing the phrase "I Love You", 62 representing the phrase "I do not like that", and so on. FIG. 4 shows a possible flow diagram for the software that can be used with the speech simulation system. The Main Program of the software initializes and presents a phrase N of List M. The Main Program awaits for detection of an event from the sensor. If there is no event, the Main Program will auto zero the sensor after the allotted time period. If an event is detected, the Main Program will determine the event and either skip to the next phrase or play the phrase through the second audio device. Instead of playing the phrase through the second audio device, this type of programming can be used to store the phrase for later use in the database a string of thoughts of the user.

The software includes the ability to re-arrange phrases within choice lists and includes allowing the user to re-arrange the position of words/phrases within the choice lists, at positions of the user's own choosing. For example, after the user selects a word or phrase, by activating the sensor for a longer than usual time, the software would present a further choice such as "Do you want to move this phrase?". If an affirmative event is received, further choices to determine the new position would be presented, such as "Move up or down in the current list" or "Move up/down to the list above or below". In this way, the user is able to customize, optimize and create new lists to enhance communications.

It is envisioned the speech simulation system could be a cell phone type device. The cell phone type device includes cell phones, smart phones and tablets. The cell phone would use its own computer processor to execute the software of the speech simulation system. An external sensor can be connected to the cell phone. Another alternative is to use an internal function of the cell phone as the sensor, for example, the camera of the cell phone could be a sensor. The software could be as simple as an "app" commonly used with cell phones. The feedback device can be an earphone jack for connection of an earphone. The output device can be the transmitter to link output to other cell phones or can be an external speaker of the cell phone. The sensor may be the gravity/accelerometer/position sensor contained within the cell phone. The cell phone may be directly attached to the user such as a knee, arm, etc. as a motion sensor, eliminating the need for a separate sensor. The software program of this invention may reside either wholly or partially within the cell phone and/or on a remote server via wi-fi or internet connections. The stored phrases of this invention may reside either wholly or partially within the cell phone and/or on a remote server via wi-fi or internet connections. The internet can be used to add new words and have access to up and coming topics for communication.

While different embodiments of the invention have been described in detail herein, it will be appreciated by those skilled in the art that various modifications and alternatives to the embodiments could be developed in light of the overall teachings of the disclosure. Accordingly, the particular arrangements are illustrative only and are not limiting as to the scope of the invention that is to be given the full breadth of any and all equivalents thereof.

I claim:

1. A speech simulation system for a user to communicate with others via a sequence of word choices selected by the user, comprising:
   a first sensor positionable at a first body part of the user and configured to generate sensor data instances, each sensor data instance being indicative of a controlled action of the first body part by the user;
   a second sensor positionable at a second body part of the user and configured to generate sensor data instances, each sensor data instance being indicative of a controlled action of the second body part by the user, the second body part being different from the first body part;
   memory configured to store the word choices and prerecorded sounds, each of the prerecorded sounds being associated with at least one word choice, the prerecorded sounds including at least one of: words, phrases and sentences;
   a first audio device positionable at the ear of the user and configured to present audio to the user;
   a second audio device separate from the first audio device and configured to present audio to the others;
   a computer processor coupleable to the first and second sensor, the memory, the first audio device and the second audio device, the computer processor configured to:
   present a first word from a first list of word choices to the user via the first audio device;
   while presenting the first word from a first list of word choices to the user, receive a first data instance from the first sensor corresponding to a controlled action by the user indicating a user selection to skip the first word of the word choices in the first list of word choices;
   in response to determining that the user selected to skip the first word from the first list of word choices, present a second word from the first list of word choices to the user;
   while presenting the second word from a first list of word choices to the user, receive a first sensor data instance from the second sensor corresponding to a controlled action by the user indicating a user selection of the second word from the first list of word choices;
   in response to determining that the user selected one of the word choices of the first list of word choices based on the first sensor data instance, present a first word from a second list of word choices to the user via the first audio device;
   while presenting the first word from a second list of word choices to the user, receive a first data instance from the first sensor corresponding to a controlled action by the user indicating a user selection to skip the first word from the second list of word choices;

in response to determining that the user selected to skip the first word from the second list of word choices, present a second word from the second list of word choices to the user;

while presenting the second word from the second list of word choices to the user, receive a second sensor data instance from the second sensor corresponding to a controlled action by the user indicating a user selection of the second word from the second list of word choices;

after determining that the user selected one of the word choices of the second list of word choices based on the second sensor data instance, present, via the second audio device, the one of the prerecorded sounds associated with at least the second word from the first list of word choices and the second word from the second list of word choices selected by the user.

2. The speech simulation system of claim 1, wherein before presenting a first word from a first list of word choices to the user via the first audio device, the computer processor is further configured to:

present a list of categories to the user via the first audio device;

receive a third sensor data instance from the second sensor corresponding to a controlled action by the user indicating a user selection of one of the categories in the list of categories;

in response to determining that the user selected one of the categories based on the third sensor data instance, present the first word from the first list of word choices to the user via the first audio device.

3. The speech simulation system of claim 2, wherein the second sensor is a position sensor positionable at the first body part of the user and configured to detect movement of the body part of the user to indicate the controlled action, and wherein determining that the user selected a word from a list of words includes:

comparing a received sensor data instance indicative of a first position of the position sensor relative to an average position of the position sensor, the average position being based on the long term average of previous sensor data instances of the position sensor; and determining that the user selected the word from the list of words based on the comparison.

4. The speech simulation system of claim 3, wherein the first sensor is a first potentiometer positionable at a first joint of the first body part of the user via a first pair of straps, the first strap of the first pair of straps being positionable at a first end of the first joint and the second strap of the first pair of straps being positionable at a second end of the first joint, and wherein the second sensor is a second potentiometer positionable at a second joint of the second body part of the user via a second pair of straps, the first strap of the second pair of straps being positionable at a first end of the second joint and the second strap of the second pair of straps being positionable at a second end of the second joint.

5. The speech simulation system of claim 3, wherein at least one of: the first sensor and the second sensor are positioned between the teeth of the user.

6. The speech simulation system of claim 3, wherein the computer processor is configured to process one or more sensor data instances using integrated firmware.

7. The speech simulation system of claim 3, wherein the first sensor, memory, first audio device, second audio device and computer processor are integrated in a cellular phone and wherein the second sensor is coupleable to the cellular phone.

8. The speech simulation system of claim 3, wherein the first body part is a first limb of the user and the second body part is a second limb of the user.

9. The speech simulation system of claim 3, wherein the first body part is a limb of the user and the second body part is a joint of the user.

10. The speech simulation system of claim 3, wherein the first body part is a limb of the user and the second body part is a digit of the user.

11. The speech simulation system of claim 3, wherein the first body part is a first joint of the user and the second body part is a second joint of the user.

12. The speech simulation system of claim 3, wherein the first body part is a joint of the user and the second body part is a limb of the user.

13. The speech simulation system of claim 3, wherein the first body part is a joint of the user and the second body part is a digit of the user.

14. The speech simulation system of claim 3, wherein the first body part is a first digit of the user and the second body part is a second digit of the user.

15. The speech simulation system of claim 3, wherein the first body part is a digit of the user and the second body part is a limb of the user.

16. The speech simulation system of claim 3, wherein the first body part is a digit of the user and the second body part is a joint of the user.

17. The speech simulation system of claim 3, wherein the first body part is a muscle of the user and the second body part is a limb of the user.

18. The speech simulation system of claim 3, wherein the first body part is a muscle of the user and the second body part is a digit of the user.

19. The speech simulation system of claim 3, wherein the first body part is a muscle of the user and the second body part is a joint of the user.

20. The speech simulation system of claim 1, wherein the first sensor is an audio sensor configured to detect intentional grunts or coughing sounds corresponding to a controlled action by the user indicating a user selection to skip one of the words of the word choices in a list of word choices.

21. The speech simulation system of claim 1, wherein the second sensor is an audio sensor configured to detect intentional grunts or coughing sounds corresponding to a controlled action by the user indicating a user selection to select one of the words of the word choices in a list of word choices.

* * * * *